May 19, 1964
A. M. BEST
3,133,625
CONNECTING MEANS FOR CONVEYING APPARATUS
Filed Oct. 2, 1961
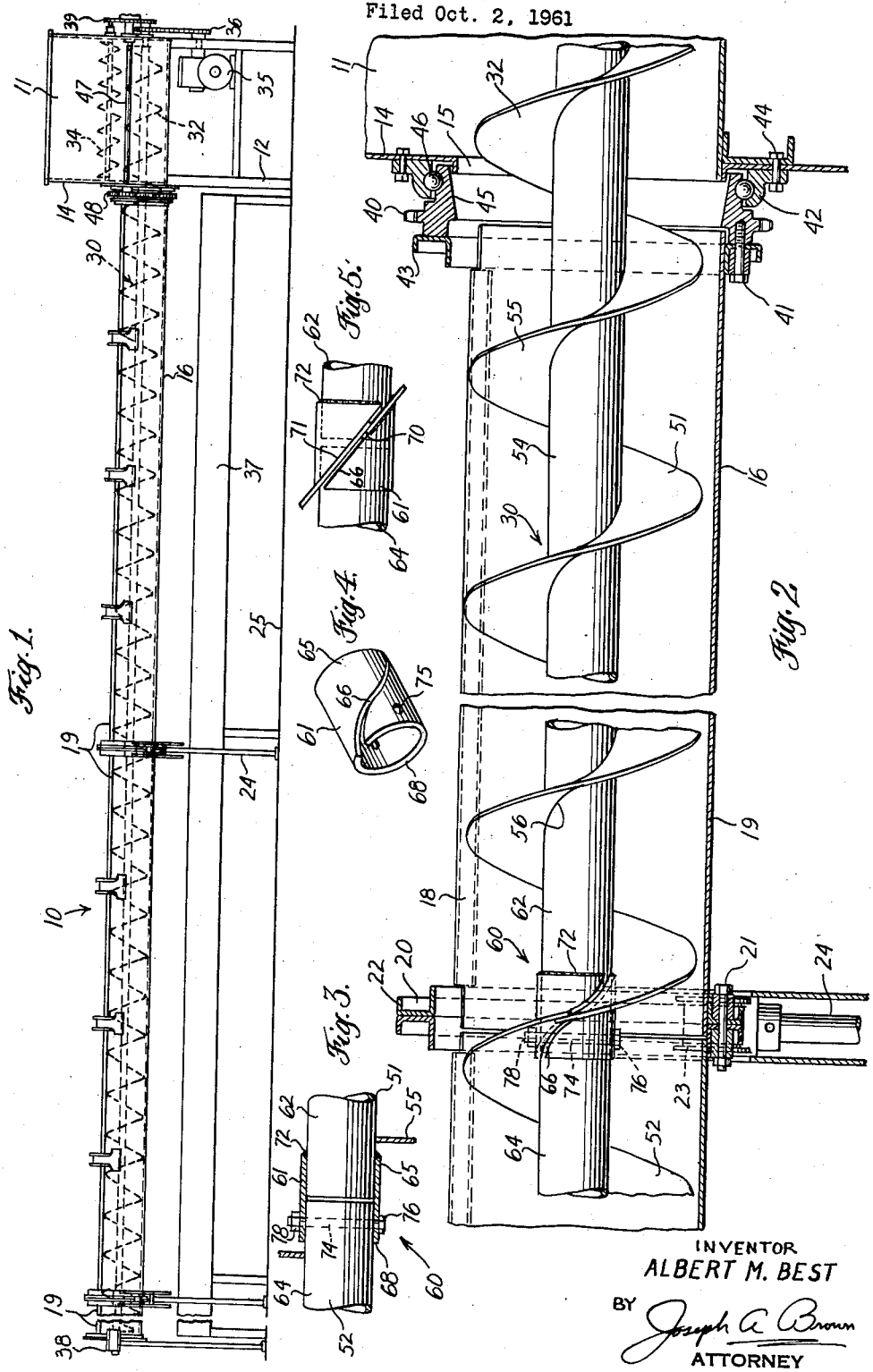
INVENTOR
ALBERT M. BEST
BY
ATTORNEY

United States Patent Office 3,133,625
Patented May 19, 1964

3,133,625
CONNECTING MEANS FOR CONVEYING
APPARATUS
Albert M. Best, New Holland, Pa., assignor to Sperry Rand Corporation, New Holland, Pa., a corporation of Delaware
Filed Oct. 2, 1961, Ser. No. 142,431
6 Claims. (Cl. 198—64)

This invention relates generally to stock feeders adapted to convey and distribute forage and the like, and more particularly to a feeder wherein an auger is provided as the conveying element. Still more specifically, the invention relates to an improved means in a stock feeder for connecting successive auger sections to each other.

Many stock feeder devices employ auger means for conveying crop material. Conventionally, a plurality of interconnected auger sections are used, the number of sections provided determining the overall length of the feeder. For example, fifteen ten foot auger sections might be employed to provide a feeder one hundred and fifty feet long. In such an arrangement, the terminal end of one auger section is connected to lead end of the next auger section and so on along the feeder. Where fifteen auger sections are provided, fourteen connections are required.

In certain crop materials, such as flail cut forage, relatively long and stringy pieces form part of the material. These pieces tend to catch onto obstructions which they may engage and then resist conveyance by the auger. Any pieces of material which become caught, tend to interfere with the conveyance of other material. There is little problem with material catching onto an auger section at points between the ends thereof. However, where one auger section connects to the next auger section, problems result. The material must pass over the connection means employed and projecting structure is disadvantageous.

Further, when the connection means provided comprises a stub shaft projected into holes in the adjacent auger shaft ends, difficulty is experienced. Axial alignment of the stub shaft and the auger shaft is critical. The stub shaft is expensive and it adds significantly to the weight of the overall auger. Where the stub shaft is connected to an auger shaft by a transverse drive bolt, the shear radius of the bolt is inside the auger shaft.

A main object of this invention is to provide an improved device for connecting one auger section to another auger section, the structure employed providing a minimum of interference with the conveyance of material.

Another object of this invention is to provide an auger connection device which is adapted to be used to connect standard auger sections having shafts of uniform diameter from end to end and flights provided with uniform bores from end to end.

Another object of this invention is to provide an auger connection device of the character described which can be used with conventional stock auger sections and involves a minimum in manufacturing costs.

Another object of this invention is to provide auger section connection means which involves no critical alignment problems, a single drive bolt being employed and the shear radius of the bolt being located outside the auger shaft.

A still further object of this invention is to provide a connector device which is easily fabricated and assembled thereby keeping manufacturing, assembly and repair costs at a minimum.

Other objects of this invention will be apparent hereinafter from the specification and from the recital in the appended claims.

In the drawing:
FIG. 1 is a side elevation of a stock feeder having auger means as the conveying element, the auger being divided into a plurality of auger sections which are interconnected by devices constructed according to this invention;
FIG. 2 is an enlarged vertical section of one portion of the feeder and showing one of the connection devices;
FIG. 3 is a fragmentary section of the connection device taken on the vertical plane through FIG. 2;
FIG. 4 is a perspective view of the connector sleeve which comprises an essential part of the device; and
FIG. 5 is a generally diagrammatic view illustrating the locations of related parts of the adjacent auger sections and the relationship of the connection device thereto.

Referring now to the drawings by numerals of reference, and first to FIG. 1, 10 denotes a stock feeder comprising a hopper 11 mounted on a frame 12. The hopper 11 is located at one end of the feeder and is adapted to receive a supply of forage or other material to be distributed. One side wall 14 of hopper 11 is provided with an outlet opening 15 (FIG. 2) which communicates with a horizontally extending elongate container 16. Container 16 comprises a tubular trough-like structure having an axial slot 18 which extends from one end of the container to the other. Normally, slot 18 is located adjacent the upper portion of the container.

Container 16 comprises a group of sections 19, the number of sections provided determining the overall length of the apparatus. Conventionally, the ends of each section 19 have flanged portions 20 and the flange portion on one section is adapted to be connected to the flange portion on the next section by bolt means 21. The flanges 20 provide rings 22 supported on rollers 23 of stands 24 which rest on the ground 25, or on a concrete apron if one is provided. Container 16 is mounted on the stands 24 for rotatable movement relative thereto, whereby the slot 18 may be moved from an upper to a lower position to discharge the contents of the container.

For distributing material along the length of the container 16, an auger conveyor 30 is provided having a section 32 which projects inside the hopper 11. An agitator auger 34 is provided above auger section 32 to loosen the material so that it will feed downwardly in the hopper 11 to the auger conveyor. A motor 35 is provided, mounted on the frame 12 of the hopper, which operates through drive train 36 to rotate the auger. The auger rotates in such a direction that material is withdrawn from the hopper 11 and conveyed and distributed along container 16 toward the terminal end 38. The drive train 36 includes a section 39 which operates the agitator auger 34.

When forage or other material has been conveyed along the full length of the container 16, a feed bunk 37 beneath the feeder is adapted to be filled with the material by rotating container 16. Such rotation is achieved by a drive sprocket 40 connected by bolts 41 to container flange 43. The container is rotatable relative to the hopper 11. An outer race 42 of a bearing is fixedly connected to the hopper by bolts 44. The sprocket 40 has a section 45 which forms the inner race of the bearing and interposed between races 42 and 45 are a series of balls 46. The drive to the sprocket 40 is from the motor 35 by chain means 48 (FIG. 1) driven by a shaft 47 connected to motor 35. Such connection includes clutch means, not shown. The structure provided is such that auger 30 operates to fill container 16 along its full length. Then, a drive to the sprocket 40 is provided to rotate container 16 one revolution. The slot 18 is thus moved from an upper position to a lower position, to discharge the contents of the container and then back to starting position. This fill and dump cycle can be repeated as many times as desired to thereby provide an appropriate amount of crop material in the feed bunk 37 where stock animals can feed. The overall fill and dump arrangement may be similar to that shown in U.S. Patent No. 2,940,639, issued June 14, 1960.

Auger 30 comprises a plurality of auger sections, such as sections 51 and 52, FIG. 2, there being one auger section for each container section 19. Each auger section comprises a shaft 54 which is of uniform diameter from end to end. Mounted on and wound around shaft 54 is flighting 55 having a bore 56 which is of uniform diameter from one end of the auger section to the other. The flighting 55 is connected to shaft 54 by suitable means such as spot welding.

In the conveyance of crop material through container 16, the material moves freely from one end of each auger section to the other end. However, a problem is created where the material is moved from one auger section to the next auger section. If the crop material is long cut flail forage material there is a tendency for the material to catch on to any obstruction which may be in its path. To minimize interference with the conveyance of material, and simplify the connection structure provided, each auger section is connected to the next auger section by a connector device 60 constructed according to this invention.

The connector 60 comprises a sleeve 61 having a bore of uniform diameter. The inside diameter of the sleeve 61 is such that it will readily slide over the auger shaft sections 54. Sleeve 61 fits over the rear or terminal end 62 of auger section 51 and the lead end 64 of the auger section 52. As shown best in FIG. 3, the sleeve 61 is located so that its extension over the ends 62 and 64 of the shafts of the auger sections 51 and 52 is approximately equal.

Sleeve 61 has a slot 66 which extends from one axial end of the sleeve to the other. Slot 66 is curved on the same helix as the flights 55 on the auger sections. Thus, to mount the sleeve 61 on the shaft end 62, it is merely necessary to insert the rear end 70 of flight 55 into the slot and then rotate the sleeve and slide it axially to desired position. The rear end 68 of sleeve 61 is adapted to receive in slot 66 the forward end 71 of the flight of auger section 52. It is necessary to rotate auger section 52 to slide it axially into the sleeve. Slot 66 has a width substantially equal to or slightly greater than the width of two flights. Thus, as best shown diagrammatically in FIG. 5, the flight end 70 on auger section 51 and the flight end 71 on the auger section 52 may be disposed in overlapping relationship. The rear end 70 of the flight of the auger section 51 terminates approximately adjacent the end of its shaft 54. However, the forward end 71 of the flight of the auger section 52 projects axially beyond its shaft 54 to provide for the overlap with flight end 70. The end 71 is adapted to be located behind flight end 70 relative to the flow of material whereby material will freely pass from one auger flight to the next.

In assembly, the sleeve 61 is connected to the auger section 51 by applying a weld bead 72 along the forward end 65 of sleeve 61. This weld bead provides a rounded shoulder over which the forage or other material may freely flow. In like respect, the side of end flight 70 of auger section 52 is welded along slot 66 to the sleeve to fixedly connect the flight to the sleeve. The forward end of auger section 52 is connected to the terminal end of the auger section 51 by inserting flight 71 in slot 66 and the shaft 54 into the sleeve 61. Then the auger section is rotated to thread it into the sleeve. When in proper axial position, as shown in FIG. 2 with flight 71 behind flight 70, a drive bolt 74 is projected through aligned holes 75 in sleeve 61 and a similar hole in the auger shaft 54. The head 76 is adapted to be located in the stream of conveyed material while the shank 78 projects on the opposite side of the auger flights and outside the stream of material. The small rounded bolt head provides a minimum of interference with the conveyed material while the bolt shank is so located that it will not interfere with the conveyance.

With this structure, stock size auger sections may be employed. Auger sections are useable which have shafts of uniform diameter from end to end and flights having bores of uniform diameter. Manufacture of sleeve 61 and welding it to the terminal end of an auger section is relatively easy. Then to connect one auger section to the next, a single drive connection bolt 74 is required. Likewise, merely by removing the bolt, one auger section can be separated from the next. The design provides a strong connection, the shear radius of bolt 76 being outside of shaft 54 instead of inside as heretofore.

In operation, material is conveyed through the container 16. It passes from flight to flight along auger section 51 and when connector 60 is reached, the material freely flows over the rounded shoulder provided by weld bead 72. Then the material flows along flight portion 70 and drops to flight portion 71 of the auger section 52. It has been found that with this design, bunching of material at the point where the successive auger sections are connected to each other is eliminated. This insures an even distribution of material throughout the length of the container 16 so that when the container is rotated to dump the contents thereof, the material will be distributed in an even ribbon along the full length of the apparatus.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described my invention, what I claim is:

1. An improvement in a device for conveying crop material and the like including a hopper having an outlet opening, an elongate container communicating with said hopper opening, said container having a forward end adjacent said hopper and a rear end remote therefrom, an auger rotatable in said container and operative to withdraw material from said hopper and convey the material from said forward end toward said container rear end, said auger comprising a plurality of interconnected auger sections, each auger section being the same as the other auger sections and comprising a shaft of uniform diameter from end to end having helical flights wound around the shaft and fixed thereto, said flights having bores of uniform diameter, and means for connecting the rear end of one auger section to the forward end of the next auger section and minimize interference with the conveyance of material from one auger section to the next, the improvement relating to said connecting means and comprising a sleeve having a forward end and a rear end, said sleeve surrounding the rear end of the shaft of said one auger section and the forward end of the shaft of the next auger section, a slot extending from one axial end of said sleeve to the other and on the same helix as the flights on said auger sections, said slot being adapted to receive the flights of the respective auger sections, and means connecting said sleeve to each of said auger sections.

2. An improvement in a device for conveying crop material and the like including a hopper having an outlet opening, an elongate container communicating with said hopper opening, said container having a forward end adjacent said hopper and a rear end remote therefrom, an auger rotatable in said container and operative to withdraw material from said hopper and convey the material from said forward end toward said container rear end, said auger comprising a plurality of interconnected auger sections, each auger section being the same as the other auger sections and comprising a shaft of uniform diameter from end to end having helical flights wound around the shaft and fixed thereto, said flights having bores of uniform diameter, and means for connecting the rear end of one auger section to the forward end of the next auger section and minimize interference with the conveyance of material from one auger section to the next, the improvement relating to said connecting means and comprising a sleeve having a forward end and a rear end, said sleeve surrounding the rear end of the shaft of said one auger section and the forward end of the shaft of the next auger section, a slot extending from one axial end of said sleeve to the other and on the same helix as the flights on said auger sections, said slot being adapted to receive the flights of the respective auger sections in overlapping relation to each other, the flight on at least one auger section projecting beyond the adjacent shaft end of the auger section, means fixedly connecting said sleeve to one of said auger sections, and means detachably connecting said sleeve to the other of said auger sections.

3. An improvement in a device for conveying crop material and the like including a hopper having an outlet opening, an elongate container communicating with said hopper opening, said container having a forward end adjacent said hopper and a rear end remote therefrom, an auger rotatable in said container and operative to withdraw material from said hopper and convey the material from said forward end toward said container rear end, said auger comprising a plurality of interconnected auger sections, each auger section being the same as the other auger sections and comprising a shaft of uniform diameter from end to end having helical flights wound around the shaft and fixed thereto, said flights having bores of uniform diameter, and means for connecting the rear end of one auger section to the forward end of the next auger section and minimize interference with the conveyance of material from one auger section to the next, the improvement relating to said connecting means and comprising a sleeve having a forward end and a rear end, said sleeve surrounding the rear end of the shaft of said one auger section and the forward end of the shaft of the next auger section, a slot extending from one axial end of said sleeve to the other and on the same helix as the flights on said auger sections, said slot being adapted to receive the flights of the respective auger sections, means fixedly connecting said sleeve forward end to the shaft rear end of said one auger section and providing a rounded shoulder over which said material may freely flow, and means detachably connecting said sleeve rear end to the shaft forward end of said auger section.

4. An improvement in a device for conveying crop material and the like including a hopper having an outlet opening, an elongate container communicating with said hopper opening, said container having a forward end adjacent said hopper and a rear end remote therefrom, an auger rotatable in said container and operative to withdraw material from said hopper and convey the material from said forward end toward said container rear end, said auger comprising a plurality of interconnected auger sections, each auger section being the same as the other auger sections and comprising a shaft of uniform diameter from end to end having helical flights wound around the shaft and fixed thereto, said flights having bores of uniform diameter, and means for connecting the rear end of one auger section to the forward end of the next auger section and minimize interference with the conveyance of material from one auger section to the next, the improvement relating to said connecting means and comprising a sleeve having a forward end and a rear end, said sleeve surrounding the rear end of the shaft of said one auger section and the forward end of the shaft of the next auger section, a slot extending from one axial end of said sleeve to the other and on the same helix as the flights on said auger sections, said slot being adapted to receive the flights of the respective auger sections, weld means fixedly connecting said sleeve forward end to the shaft rear end of said one auger section and providing a rounded shoulder over which said material may freely flow, weld means fixedly connecting a portion of the flight of said one auger section to said sleeve, and a bolt detachably connecting said sleeve rear end to the shaft forward end of said other auger section, the flight on said other auger section being free of said sleeve and projecting beside and behind the flight of said one auger section.

5. An improvement in a device for conveying crop material as recited in claim 4 wherein said bolt has a head and shank, the bolt being so located that material conveyed flows over said head and on one side of the auger flights and the bolt shank is located outside the flow of material and on the opposite side of the auger flights.

6. An improvement in a device for conveying crop material as recited in claim 4 wherein said slot in said sleeve is of sufficient width to permit said flights to extend side by side.

References Cited in the file of this patent
UNITED STATES PATENTS

| | | |
|---|---|---|
| 505,806 | Allfree | Oct. 3, 1893 |
| 1,589,630 | Cooper | June 22, 1926 |
| 1,744,595 | Turner | Jan. 21, 1930 |
| 1,906,247 | Buff | May 2, 1933 |
| 2,769,526 | Herscovitch | Nov. 6, 1956 |
| 2,940,639 | Winter | June 14, 1960 |